United States Patent [19]
Imai et al.

[11] Patent Number: 5,127,245
[45] Date of Patent: * Jul. 7, 1992

[54] DEVICE FOR LOCKING SHIFT LEVER OF AUTOMATIC TRANSMISSION

[75] Inventors: Hajime Imai; Shozo Kito, both of Nagoya; Shoichi Harada, Gifu; Yoshinobu Yokoyama, Inuyama; Syuzi Nakamura, Toyota; Shingetoshi Miyoshi, Toyota; Tadao Muramatsu, Toyota, all of Japan

[73] Assignee: Kabushiki Kaisha Tokai-Rika-Denki-Seisakusho, Japan

[*] Notice: The portion of the term of this patent subsequent to Apr. 2, 2008 has been disclaimed.

[21] Appl. No.: 677,394

[22] Filed: Mar. 29, 1991

Related U.S. Application Data

[63] Continuation-in-part of Ser. No. 243,759, Sep. 13, 1988, Pat. No. 5,003,799.

[30] Foreign Application Priority Data

| Sep. 14, 1987 [JP] | Japan | 62-140648 |
| Sep. 14, 1987 [JP] | Japan | 62-140649 |
| Oct. 1, 1987 [JP] | Japan | 62-150888 |

[51] Int. Cl.⁵ .................................. E05B 65/12
[52] U.S. Cl. ........................ 70/247; 70/252; 192/4 A; 74/878
[58] Field of Search ............ 70/238, 239, 247, 248, 70/252; 192/4 A; 74/483 R, 850, 878

[56] References Cited

U.S. PATENT DOCUMENTS

| 4,232,571 | 11/1980 | Kimberlin | 70/247 X |
| 4,235,123 | 11/1980 | Simancik et al. | 70/247 X |
| 4,282,769 | 8/1981 | Sandrock | 70/247 X |
| 4,304,112 | 12/1981 | Osborn | 70/247 |
| 4,326,432 | 4/1982 | Miller | 70/248 X |
| 4,474,085 | 10/1984 | DeVogelaere et al. | 70/248 X |
| 4,671,085 | 6/1987 | Yamaguchi et al. | 70/248 |
| 4,854,193 | 8/1989 | Newman et al. | 70/248 X |
| 4,905,802 | 3/1990 | Gotoh | 70/247 X |
| 4,926,688 | 5/1990 | Murasaki | 70/248 X |
| 4,938,042 | 7/1990 | Muramatsu | 70/247 X |
| 4,967,883 | 11/1990 | Kito et al. | 70/248 X |
| 5,003,799 | 4/1991 | Imai et al. | 70/247 |
| 5,036,962 | 8/1991 | Amagasa | 70/248 X |

FOREIGN PATENT DOCUMENTS 3340394 6/1984 Fed. Rep. of Germany.

Primary Examiner—Renee S. Luebke
Assistant Examiner—Suzanne L. Dino
Attorney, Agent, or Firm—Finnegan, Henderson, Farabow, Garrett & Dunner

[57] ABSTRACT

An automatic shift lever locking device is capable of locking the shift of an automatic transmission in a specific non-driving shift position against movement from this position unless a predetermined condition is met. The device has a detent pin provided on the shift lever and movable in response to pressing of a push button on the shift lever, a movable member engageable with the detent pin, and a lock member engageable with the movable member so as to prevent the detent pin from moving out of a lock position thereby to maintain the shift lever locked in the non-driving position. Therefore, when the shift lever is not locked, the manual force exerted by the driver on the push button is not transmitted to the lock members and other parts mechanically or electrically connected to the lock member.

23 Claims, 14 Drawing Sheets

FIG.3
FIG.4
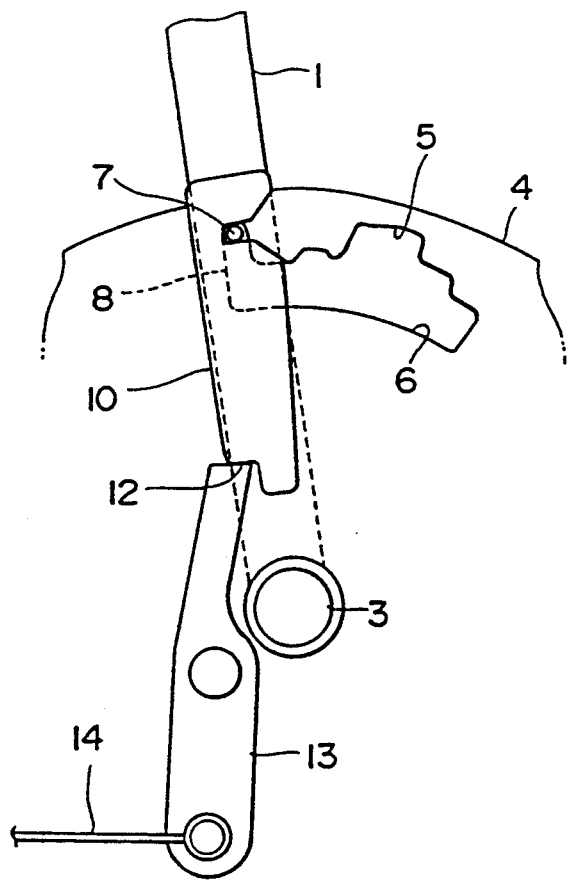
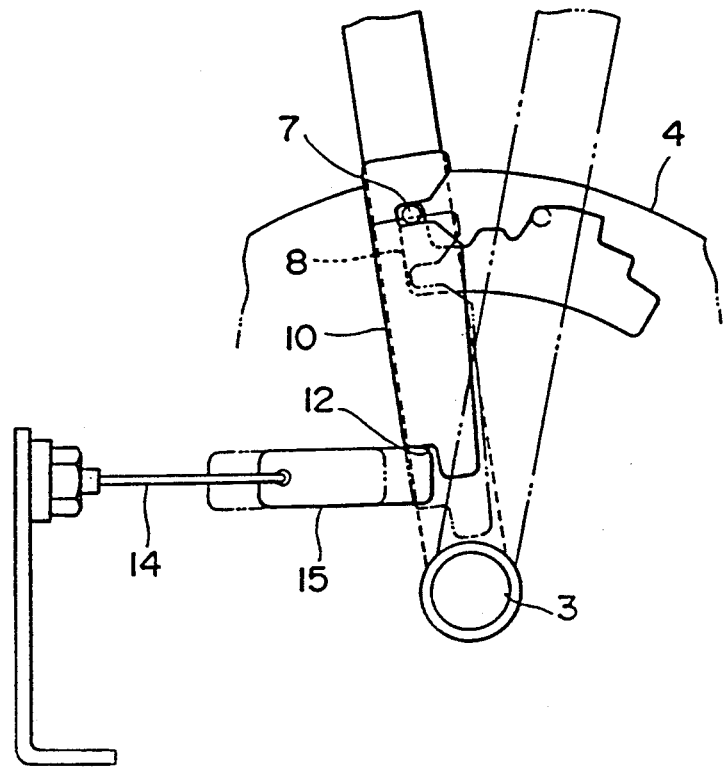

DEVICE FOR LOCKING SHIFT LEVER OF AUTOMATIC TRANSMISSION

BACKGROUND OF THE INVENTION

1. Continuity

This is a continuation-in-part application of U.S. patent application Ser. No. 07/243,759 filed Sep. 13, 1988, now U.S. Pat. No. 5,003,799.

2. Field of the invention

The present invention related to a device for locking a shift lever of an automatic transmission which is capable of inhibiting movement of the shift lever from a non-driving position such as neutral or parking position under a certain condition.

3. Description of the Related Art

When parking an automobile with an automatic transmission, it is a common practice to set the automobile in an immobile state by actuating a parking brake and setting the automatic transmission shift lever at a P (parking) position before leaving the automobile.

When restarting the automobile, the drive starts the engine while the lever is still in the P position and then moves the shift lever to a D (driving) position past an R (reversing) position. The driver, therefore has to keep the foot brake engaged during shifting from the P position to the D position, in order to prevent the automobile from moving in reverse.

Usually, the motion of the shift lever is interlocked with various other functions, For instance, an interlocking mechanism is employed in which the motion of the shift lever is interlocked with the state of a steering locking mechanism in such a manner that the movement of the shift lever from a non-driving position such as the P position or an N (neutral) position is prevented under a certain condition of the steering lock. Such an interlocking mechanism is operatively connected to a detent pin which is movable between an inoperative position and an operative position when a button on the knob of the lever is pressed and released respectively by the driver. The operation of this button tends to be impaired due to the presence of the interlocking mechanism which is connected to the detent pin. It has also been experienced that the operation of the interlocking mechanism is inconveniently influenced by the manual pressing force exerted on the button on the shift lever knob.

SUMMARY OF THE INVENTION

Accordingly, an object of the present invention is to provide a device for locking an automatic transmission shift lever which is improved in such a way as to eliminate an unfavorable effect which might otherwise be caused on the operation of the shift lever knob due to the present of an interlocking mechanism, as well as undesirable influence of the manual pressing force caused on the interlocking mechanism by the manual force exerted by the driver on the shift lever knob.

Additional object and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the shift lever locking device of this invention, which is used for locking an automatic transmission shift lever capable of being selectively moved to and set in one of a plurality of shift positions including at least one non-driving position comprises: a detent pin provided on the shift lever and designed to be moved in one direction in response to pressing of a button provided on the shift lever; a detent plate capable of selectively latching the shift lever in cooperation with the detent pin and having a locking recess capable of receiving the detent pin when the detent pin is moved in the other direction after the shift lever is set in the non-driving position; and a movable member independent of the shift lever and the detent pin, and capable of engaging with the detent pin at least when the detent pin is being brought into engagement with the locking recess and movable between a lock position where it engages with the detent pin so as to prevent the detent pin from moving and an unlock position where it is disengageable from the detent pin to allow the detent pin to move; and a lock member movable between a first position where it prevents the movable member from moving from the lock position and a second position where it allows the movable member to move from the lock position to the unlock position and capable of being moved from the second position to the first position when a predetermined condition is met while the shift lever has been set in the non-driving position.

In operation, when the predetermined condition has been met, the lock member is moved from the second position to the first position so as to hold the movable member in the lock position. In this state, the detent pin is not allowed to move even if the push button is pressed so that the detent pin cannot be disengaged from the locking recess, whereby the shift lever is immovably locked in the non-driving position.

In a first aspect of the invention, the lock member is engaged with and is releasable the movable member when it is in the first position and in the second position, respectively.

Therefore, when the lock member is in the second position, the manual pressing force exerted on the push button by the driver is not transmitted to the lock member, whereby any deterioration of the operation of the button which might otherwise be caused can be avoided.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 3 is an illustration of operation of the embodiment shown in FIG. 1;

FIG. 4 is a schematic illustration of a second embodiment of the present invention;

DESCRIPTION OF THE PREFERRED EMBODIMENTS

Figure 1:
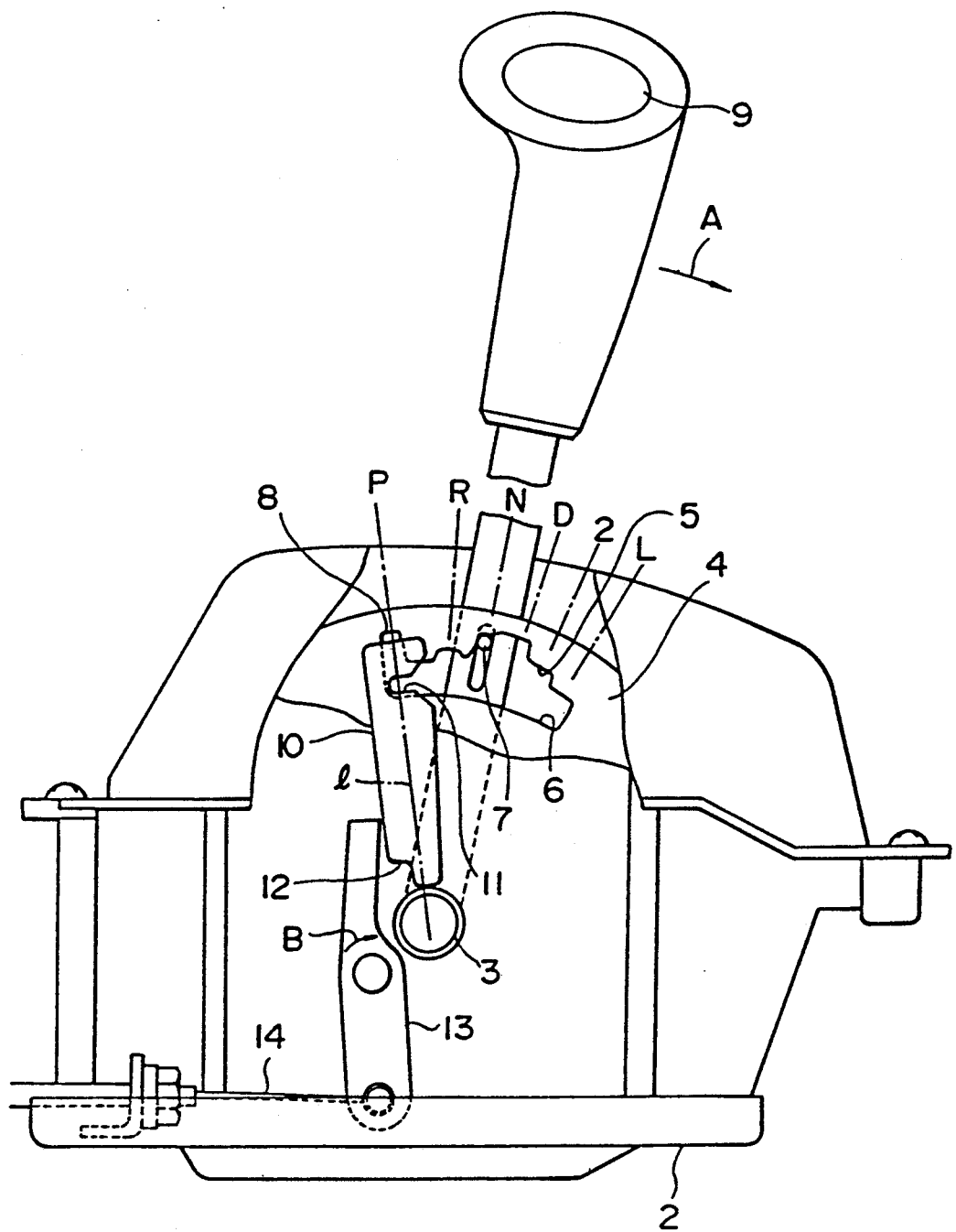
FIG. 1 is a partly-sectioned side elevational view of an embodiment of the device of the present invention for locking the shift lever of an automatic transmission.
Figure 2:
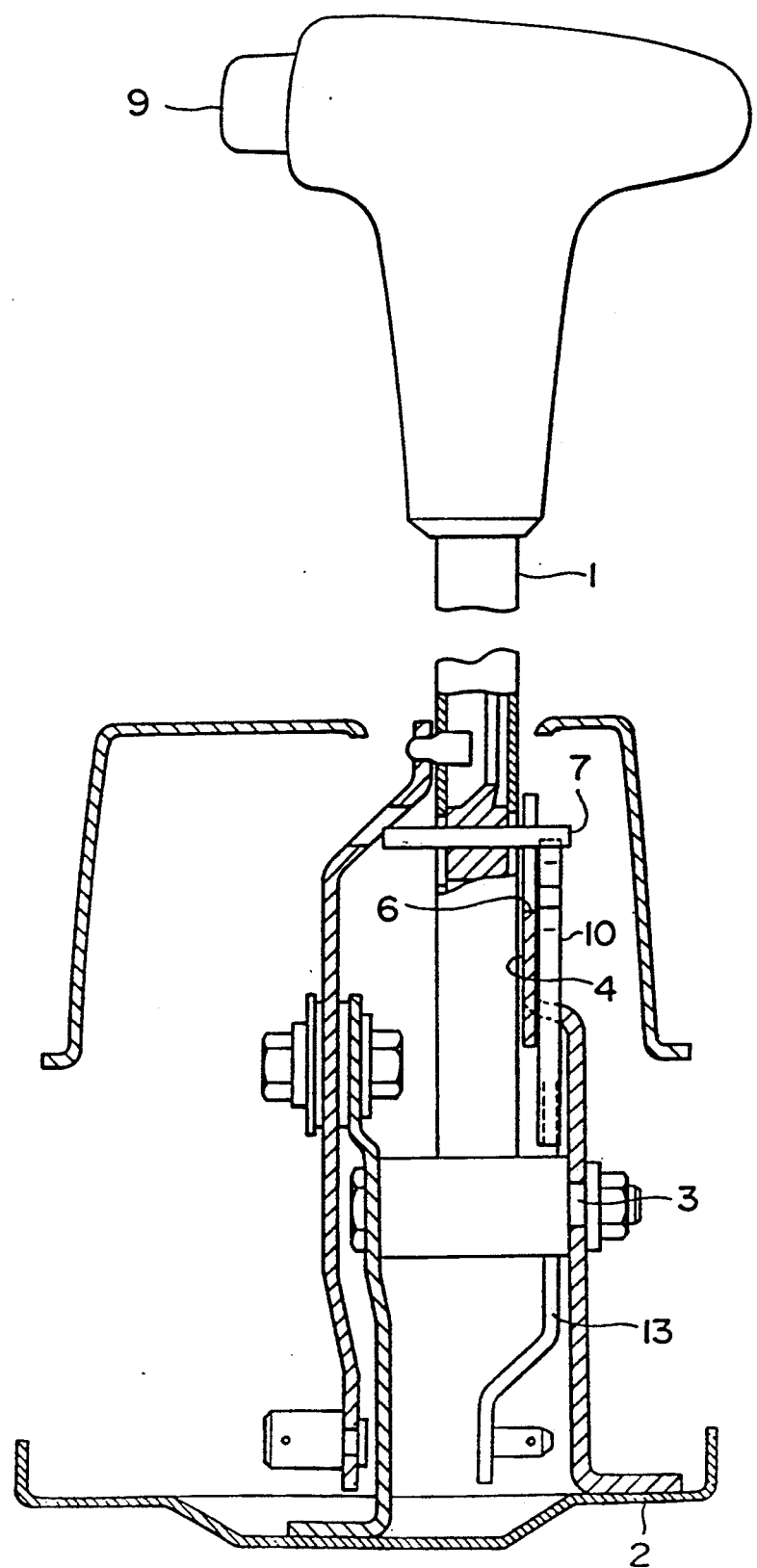
FIG. 2 is a vertical sectional view of the embodiment shown in FIG. 1.

A first embodiment of the present invention will be described with reference to FIGS. 1 to 3. An automotive automatic transmission has a shift lever 1 which is swingable about a fulcrum constituted by a shaft 3 provided on a plate 2, in the direction shown by an arrow A and also in the counter direction. A detent plate 4 fixed to the plate 2 has an engaging aperture 6 the upper edge of which is configured in the direction of swinging or rotation of the shift lever 1 so as to provided latching steps 5 which cooperate with a later-described detent pin 7 in such a manner as to selectively limit the range of the movement of the shift lever 1 when the shift lever is moved from one to another of a plurality of shift position including a P (parking) position, R (reverse) position, N (neutral) position, D (drive) position, 2nd range position and L (Low range) position. The portion of the upper edge of the aperture 6 where the detent pin 7 is located when the lever 1 is set in the P position is notched to provide a locking recess 8.

The detent pin 7 is movable along a slot formed in the shift lever 1. The arrangement is such that the detent pin is adapted to be moved to the lower end of the slot so as to be disengaged from the latching steps 5 when a push button 9 provided on a knob of the shift lever 1 is pushed by the driver. As the push button is released the detent pin 7 is moved upward into engagement with one of the latching steps corresponding to one of the shift lever position P, R, D, 2nd and L, whereby the shift lever is latched at the selected position. A movable member 10 is slidably supported by the detent plate 4 so as to slide along a line which interconnects the shaft 3 and the locking recess 8 corresponding to the P position of the shift lever. The movable member 10 is provided at an upper portion thereof with an engaging recess 11 which opens to the right as viewed in FIG. 1 so as to face the engaging aperture 6. The movable member 10 also is provided with an engaging step 12 on the left lower portion thereof as viewed in FIG. 1. A lock lever 13 which serve as a locking member is rotatably supported by the detent plate 4. When the movable member 10 is set in a lower position as shown in FIG. 1, the upper portion of the lock lever 13 abuts the side surface of the movable member 10 and is prevented from rotating clockwise, i.e., in the direction of an arrow B, whereas, when the movable member 10 is locked in an upper lock position as shown in FIG. 3, the lock lever 13 is allowed to swing clockwise until its upper end is brought into engagement with the engaging step 12 of the movable member 10. A control wire 14 is connected at its one end to the lower end of the lock member 13, while the other end of the control wire 14 is connected to a steering lock device. When the steering lock device has been released, the lock lever 13 is urged in the direction counter to the arrow B, as illustrated in FIG. 1.

The operation of this embodiment will be described hereinafter. In the inoperative state of the steering lock device, the lock lever 13 has been rotated counterclockwise to the position shown in FIG. 1, as explained above. It is assumed here that the shift lever 1 has been set in the N position. Movement of the shift lever 1 from the N position to the D position can be conducted without encountering any substantial resistance. Any further movement of the shift lever 1, however, is prevented because the detent pin 7 abuts the wall of the latching step corresponding to the D position. The driver, if the lever has to be moved to 2nd or L position, pushes the push button 9 so that the detent pin 7 is moved in one direction, which is in this case the downward direction, out of engagement with the latching step corresponding to the D position, so that the shift lever 1 can be further moved to 2nd and L positions. Returning of the shift lever from the L position to N position over the 2nd and D positions can be conducted without pushing the push button 9 because the detent pin 7 can be slid along the latching steps when the shift lever 1 moves in the direction counter to the arrow A. The driver also can move the shift lever 1 from the N position to the R position and further to the P position in the direction counter to the arrow A, by pressing the push button 9 to free the detent pin 7. Returning of the shift lever 1 from the R position to the N position can be conducted without requiring pressing of the push button 9.

When the shift lever 1 is in positions other than the P position, the movable member 10 has been displaced downward by the force of gravity, so that the lock lever 13 is prevented from rotating in the direction of the arrow B. Therefore, the engine key cannot be rotated to a locking position although it can be turned to the "engine off" position. The engine key in such a state cannot be extracted from the steering locking device. However, as the driver moves the shift lever 1 in the direction counter to the arrow A into the P position while pressing the push button 9, the detent pin 7 is brought into engagement with the engaging recess 11 of the movable member 10 which has been set in the lower position As the push button 9 is released from this depressed state, the detent pin 7 is moved in the other direction, which is in this case the upward direction, into engagement with the locking recess 8, while lifting the movable member 10 into the lock position as shown in FIG. 3. In this state, when the engine key is rotated to the steering lock position, the lock lever 13 is rotated in the direction of the arrow B so that its end is brought into engagement with the engaging step 12. The movable member 10 and, hence, the detent pin 7 are prevent from moving downward in this state despite of pressing the push button 9, and the detent pin 7 is retained in the locking recess 8 so as to prevent the shift lever 1 from moving out of the P position.

As has been described, in the first embodiment of the locking device according to the present invention, the steering lock device cannot be set and, at the same time, the engine key cannot be extracted unless the shift lever 1 is set in the P position. This eliminates possibility that the engine key can be extracted from the steering lock device during running of the automobile. Thus, the engine key can be extracted only after it has been turned to the lock position which essentially required that the shift lever 1 is set in the P position in advance. Consequently, the automobile can be set in an immobile state without fail before the driver extracts the engine key from the steering lock device. Once the steering lock device is put into effect by the operation of the engine key, the shift lever 1 is locked in the P position and can by no means be moved to another position unless the steering lock is unlocked by the engine key. In other words, only the driver who keeps the engine key with him can unlock the shift lever 1 from the P position.

In the first embodiment as described, the shift lever 1 is locked in a specific non-driving position, i.e., in the P position, on the specific condition that the steering lock device has been put in engagement by the engine key. The arrangement, however, may be such that the shift lever 1 is locked in the P position on condition that the foot brake pedal has not been applied and unlocked upon confirming that the foot brake has been put on.

The arrangement also may be such that the shift lever 1 is locked in the N position which also is a non-driving position.

FIG. 4 shows a second embodiment of the present invention in which a lock plate 15, which serves as a lock member in place of the lock lever 13 of the first embodiment, is slidably carried by the detent plate 4 so as to be brought into and out of engagement with the engaging step 12 of the movable member 10. Other portions of the second embodiment, as well as the operation, are materially the same as those of the first embodiment.

Figure 5:
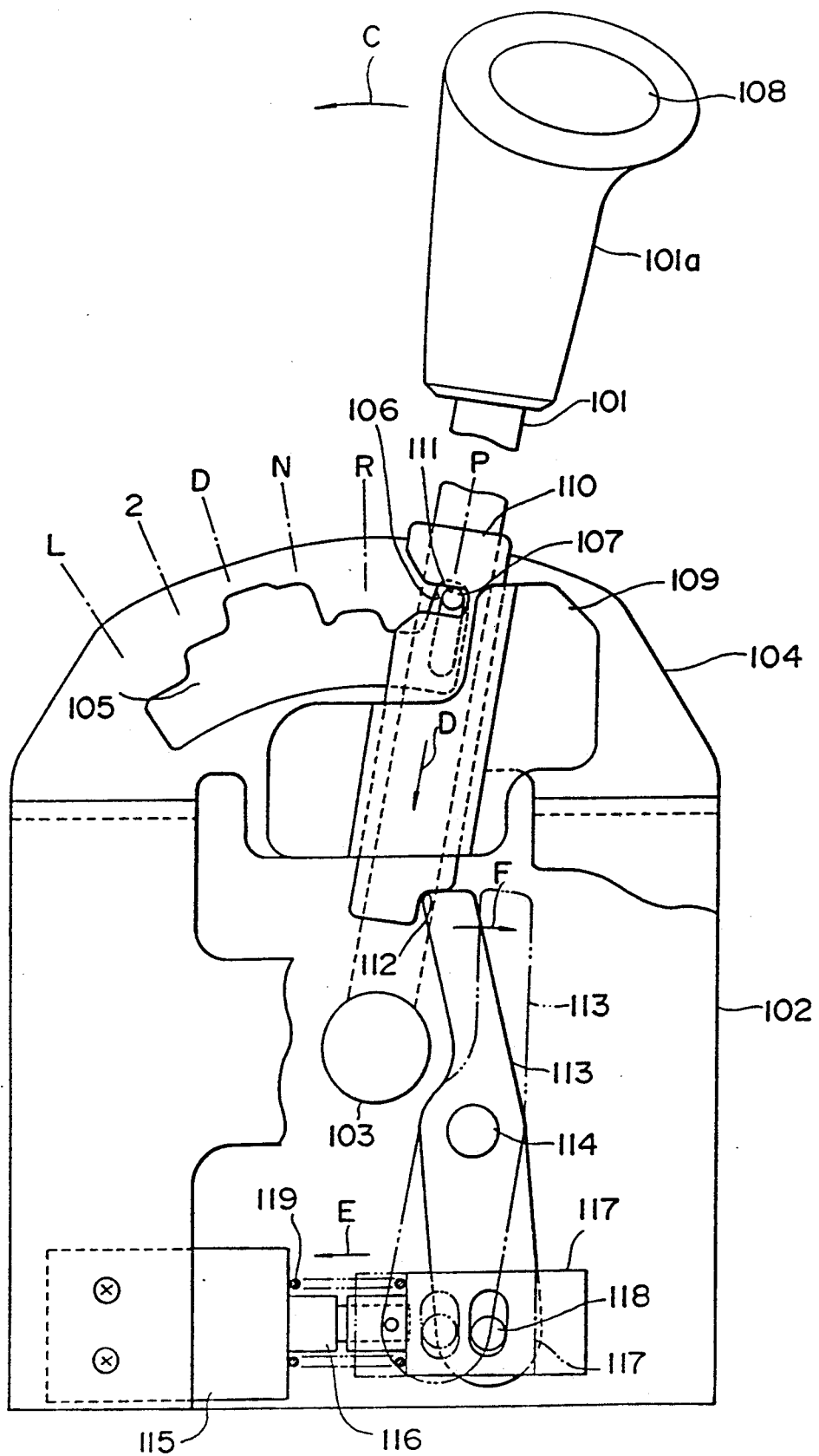
FIG. 5 is a partly-sectioned schematic side elevational view of a third embodiment of the present invention.

A third embodiment of the present invention will be described hereafter with reference to FIGS. 5 and 6.

The third embodiment of the locking device has a shift lever 101 which is mounted on the plate 102 for pivoting motion about a fulcrum provided by the shaft 103, in the direction of the arrow C and also in the direction counter to the arrow C. A detent plate 104 fixed to the plate 102 has, an shown in FIG. 5, an engaging aperture 105 the upper edge of which provides engaging or latching steps for latching a shift lever 101 selectively in one of the P, R, N, D, 2nd and L positions along the path of the pivoting motion of the shift lever 103. A notch is provided in the portion in the upper edge of the engaging aperture 105 corresponding to the P position of the shift lever 101, so as to provide a locking recess 106.

A detent pin 107 is provided on a lower portion of the shift lever 101 so as to be movable in the axial direction of the shift lever 101 along an elongated slot formed in the wall of the shift lever 101 into and out of engagement with the upper edge of the engaging aperture 105 providing the latching steps. The arrangement is such that, when a push button 108 provided on a knob 101a of the shift lever 101 is pressed by the driver, the detent pin 107 is moved in one direction, which is in this case the downward direction, so as to be disengaged from one of the latching steps provided by the upper edge of the engaging aperture 105. As the driver released the push button 108, the detent pin 107 is moved in the other direction, i.e., upward, into engagement with one of ht e latching steps provided by the upper edge of the engaging aperture Thus, the detent pin 107 cooperates with the detent plate 104 in limiting the movement of the shift lever 101.

A reference numeral 109 designates a guide member which is fixed to the detent plate 104, while a numeral 110 designates a movable member which is carried by the guide member 109 for sliding movement in the direction of the arrow D and in the direction counter the arrow D. The movable member 110 is provided at its upper portion with an engaging recess 111 which opens to the left as shown in FIG. 5 so as to confront the locking recess 106 in FIG. 6. The movable member 110 also is provided with a notched portion 112 in the right lower portion thereof as shown in FIG. 5. A lock lever 113 serving as a lock member in the device of the present invention is secured to the plate 102 through a pin 114 for swinging or pivoting motion about the pin 114.

A reference numeral 115 denotes a solenoid which is provided on a lower portion of the plate 102 and which serves as an electric actuating device. The solenoid 115 has an actuator rod 116 which projects to the right as shown in FIG. 5. The actuator rod 116 carries at its end a holder 117 which is connected to a lower portion of the lock lever 113 through a pin 118. A coiled compression spring 119 is loaded between the holder 117 and the solenoid 115. The solenoid 115 is adapted to be electrically energized only when all the three conditions are simultaneously satisfied: namely, setting the shift lever 101 in the P position, switching on the ignition switch and putting on the foot brake pedal. As the solenoid 115 is energized, the actuator rod 116 is electromagnetically attracted in the direction of an arrow E against the force of the coiled compression spring 119 so as to swing or rotate the lock lever 113 in the direction of an arrow F. When at least one of these three conditions fails to be met, the solenoid 115 is not energized so that the actuator rod 116 is pushed by the force of the compression coiled spring 119 in the direction counter to the arrow E, thereby to cause the lock lever 113 to swing or rotate in the direction counter to the arrow F. A description will be made with regard to an electric circuit for controlling the solenoid 115, in accordance with FIG. 7.

Figure 7:
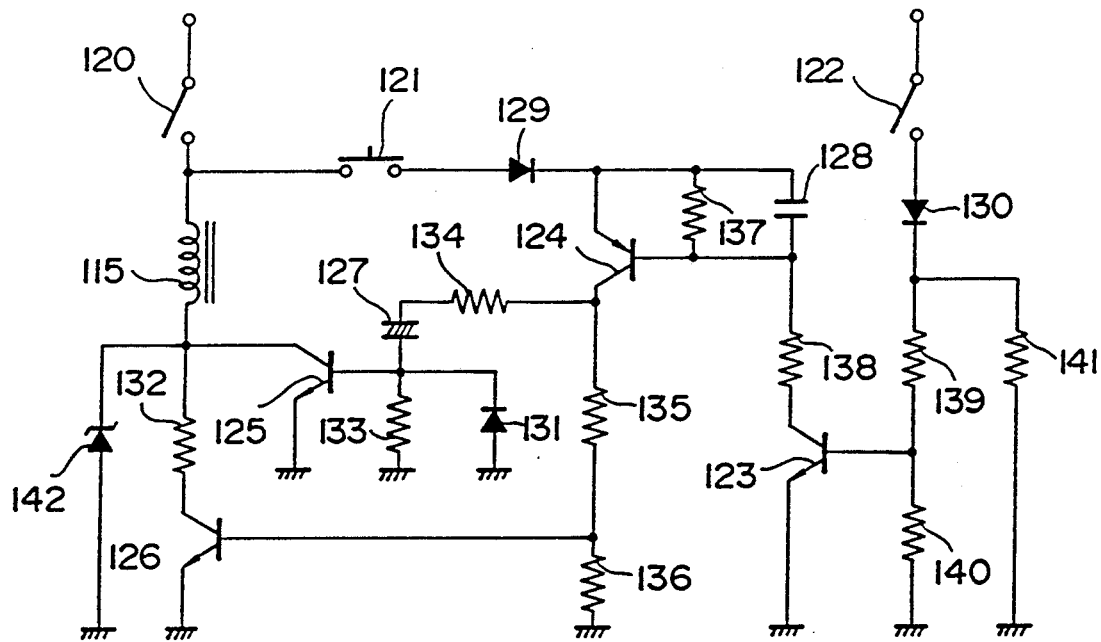
FIG. 7 is a circuit diagram of an electrical circuit incorporated in the third embodiment.
Figure 8:
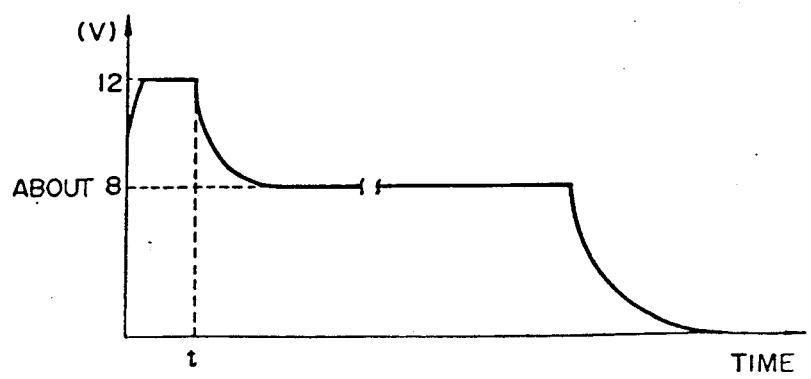
FIG. 8 is a diagram showing a change in a voltage which is applied to a solenoid.

Referring to FIG. 7, the circuit includes an ignition switch 120, a P position detection switch 121 for detecting that the shift lever is set in the P position, and a foot brake detection switch 122 which is adapted to be turned on when the foot brake pedal is pressed down. The circuit further includes transistors 123 to 126, capacitors 127 and 128, diodes 129 to 131, resistors 132 to 141, and a Zener diode 142. The operation of this circuit is as follows. The solenoid 115 is not energized whenever at least one of the ignition switch 120, P position detection switch 121 and the foot brake switch 122 is off. In such a state, the actuator rod 116 is urged in the direction counter to the arrow E by the force of the compression spring 119. The ignition switch 120 is turned on as the driver turns the ignition key. The P position detecting switch 121 is turned on if the shift lever 101 has been set in the P position. The foot brake switch 122 is turned on as the driver puts on the foot brake. When all those three switches are on, i.e., when all the three conditions mentioned before are satisfied, the transistor 123 is turned on so as to turn on also the transistor 124 and further the transistors 125 to 126. In consequence, the solenoid 115 is supplied with electric power so that the actuator rod 116 is attracted to move in the direction of the arrow E against the force of the compression coiled spring 119. As will be seen from FIG. 8, the voltage of the electric power supplied to the solenoid 116 at the time of start-up is 12 V. The transistor 125 is turned off as the capacitor 127 connected to the base of the transistor 125 is charged up at an instant t shown in FIG. 8. Thereafter, the solenoid 115 is energized only through the transistor 126 and the resistor 132, so that the voltage applied to the solenoid 115 is lowered to about 8 V. When at least one of the ignition switch 120, P position detection switch 121 and the foot brake switch 122 is turned off, i.e., when at least one of the above-mentioned three conditions is no longer maintained, a potential difference is developed across the resistor 136 during discharging of the capacitor 127, so that a base current flows through the base of the transistor 126 so as to gently turn off the transistor 126. In consequence, any impact which might be causes by the actuator rod 16 when the solenoid 115 is turned off is suppressed advantageously.

It is assumed here that the foot brake pedal is not being put on while the ignition switch 120 is in the on state and the shift lever 101 is in the P position. In this state, the detent pin 107 is received by the locking recess 106 in the detent plate 104 and is kept in engagement with the engaging recess of the movable member 110 whereby the movable member 110 is held in the lock position. Meanwhile, the solenoid 115 is kept in off state so that the actuator rod 116 of the solenoid 115 is urged in the direction counter to the arrow E by the force of the coiled spring 119. Therefore, the lock lever having been rotated in the direction counter to the arrow F as shown by solid line, has its upper end held in engagement with the notch 112 in the movable member 110. In this state, the movable member 110, which is held in engagement with the detent pin 107, is prevented from moving in the direction of the arrow D because it is stopped by the lock lever 113. In this state, the detent pin 107 cannot move downward even if the push button 108 on the shift lever 101 is pressed, so that the shift lever 101 cannot move from the P position to another shift position. Thus, the shift lever 101 is immovably locked in the P position when the foot brake pedal is not put on by the driver. As the driver applies the foot brake the solenoid 115 is turned on so that the actuator 116 is attracted in the direction of the arrow E, with the result the lock lever 113 is rotated in the direction of the arrow F as shown by two-dot-and-dash line whereby the lock lever 113 is disengaged from the movable member 110 so as to free the movable member 110. As the push button 108 is pressed in this state, the detent pin 107 is moved downward as indicated by the arrow D together with the movable member 110, so that the movable member 110 is set in an unlocking position as shown in FIG. 6. In this state, the detent pin 107 has been disengaged from the locking recess 106, so that the shift lever 101 can be moved the P position to another position.

Figure 6:
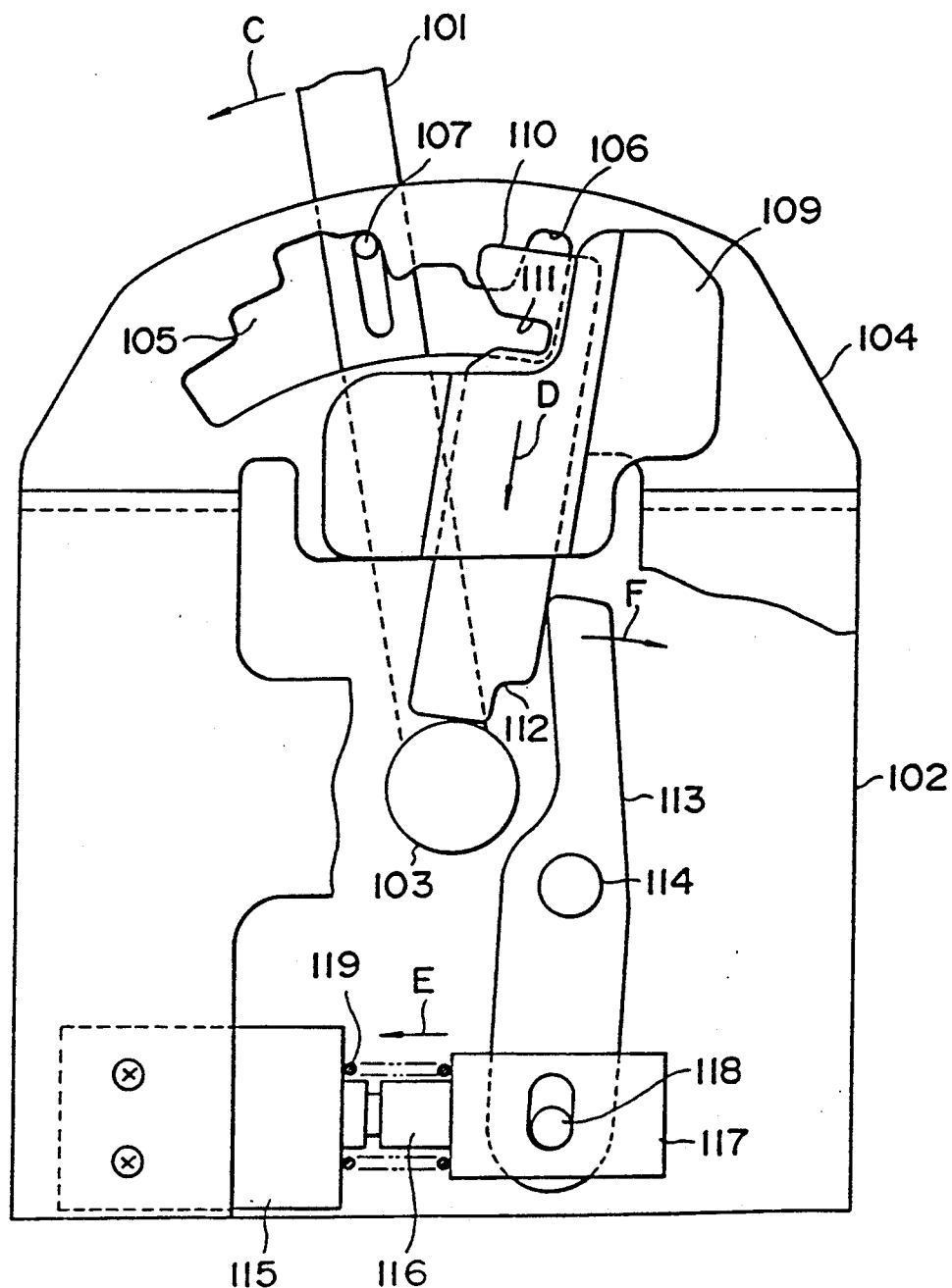
FIG. 6 is a view corresponding to FIG. 5 but showing the third embodiment in a different state of operation from the state shown in FIG. 5.

Once the shift lever 101 is shifted to another position, e.g., the N position as shown in FIG. 6, the P position detection switch is turned off so that the solenoid 115 is de-energized with the result that the lock lever 113 is urged by the force of the coiled compression spring 119 so as to bring its end into contact with the right end of the movable member 110, as will be seen in FIG. 6. The solenoid 115 is never energized even if the foot brake switch 122 is turned on due top pressing down of the foot brake pedal, insofar as the shift lever 101 is set in a position other than the P position. When the driver has moved the shift lever 101 to the P position while pressing the push button 108, the detent pin 107 is brought into engagement with the engaging recess 111 in the movable member 110. Then, as the push button is released, the detent pin 107 together with the movable member 110 is moved upward counter to the arrow D so that the detent pin 107 is brought into engagement with the locking recess 106 while the movable member 110 is set in the lock position. As a result, the lock lever 113 which has been held in contact with the right side edge of the movable member 110 is swung in the direction counter to the arrow F by the force of the coiled compression spring 119 so as to caught in the notch 112 formed in the movable member 110, whereby the shift lever 101 is immovably locked in the P position as shown in FIG. 5.

As will be understood from the foregoing description, in the third embodiment of the present invention, the solenoid 115 is never energized even if the ignition key is turned on while the shift lever 101 is set in the P position, unless the foot brake pedal is put on. In other words, the driver is obliged to apply the foot brake pedal in order to move the shift lever from the P position to another position. This arrangement therefore serves as a safety arrangement which eliminates the shift lever to be set in a driving position such as D, 2nd or L position from the P position while the foot brake pedal is not put on by the driver.

Another advantage offered by this embodiment is as follows. The solenoid 115 is energized only when all the three conditions, i.e., setting the shift lever 101 in the P position, switching on the ignition switch 120 and applying the foot brake, are simultaneously satisfied. Therefore, the solenoid 115 is never energized even when the foot brake is pressed down while the shift lever 101 is set in a position other than P position. Consequently, the durability of the locking and unlocking mechanism is remarkably improved as compared with an arrangement in which the lock lever 113 is mechanically connected to the foot brake so as to be rotated each time the foot brake is put on. The third embodiment as described also offers the following advantage. Namely, in the third embodiment, the lock lever 113 is disposed to act between the detent pin 107 and the actuator rod 116 of the solenoid 115. Therefore, a manual pressing force exerted on the push button 108 by the driver while the shift lever 101 is set in the position, which force acts to move the detent pin 107 downward, is not directly transmitted to the actuator rod 116. Therefore, any risk for the actuator rod 116 to be damaged or deformed, which might be caused if the device were designed to allow the detent pin to directly act on the actuator rod 116, is avoided and smooth operation of the solenoid 115 is ensured.

Figure 9:
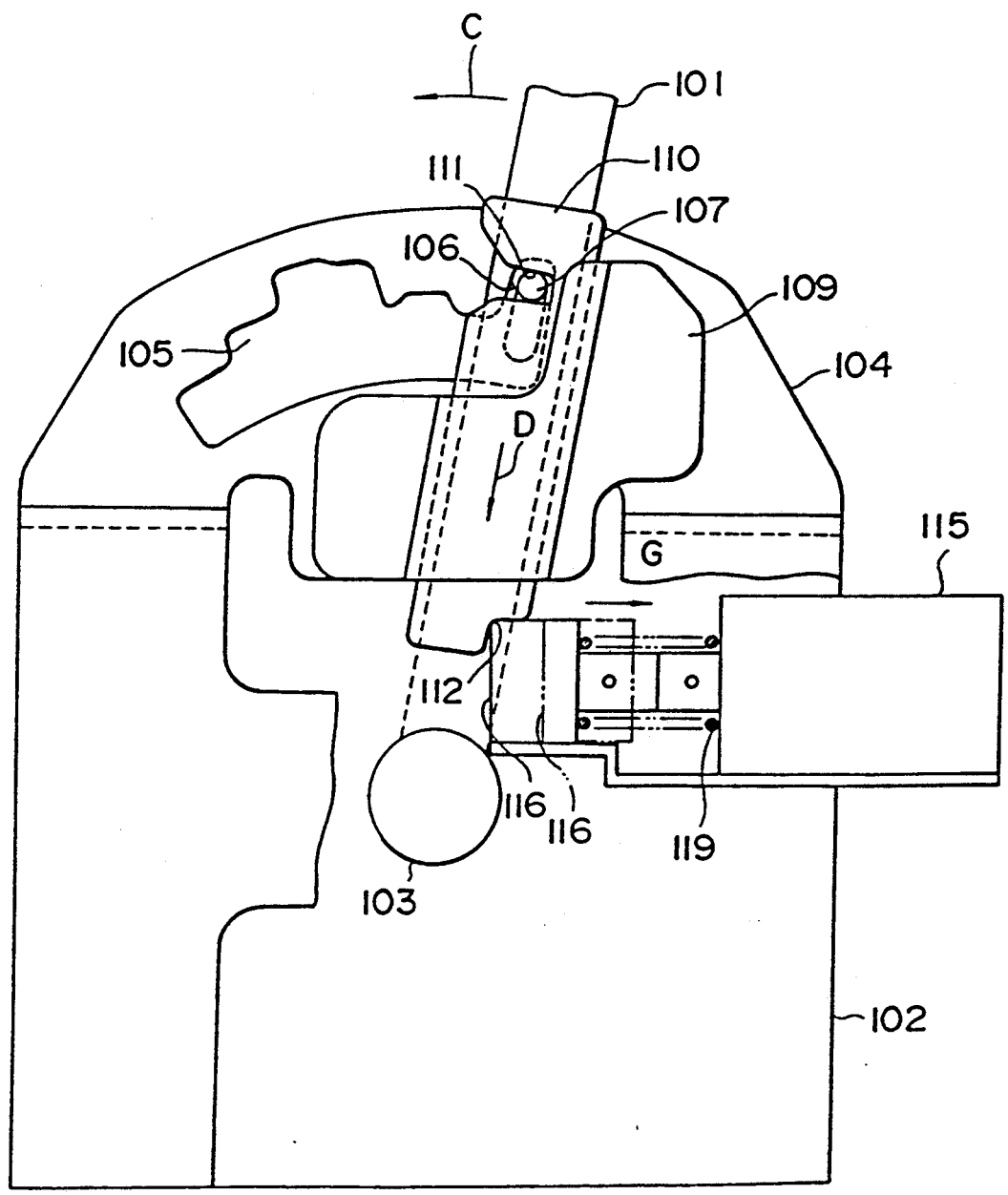
FIG. 9 is a view corresponding to that in FIG. 5 but showing a fourth embodiment of the present invention.
Figure 10:
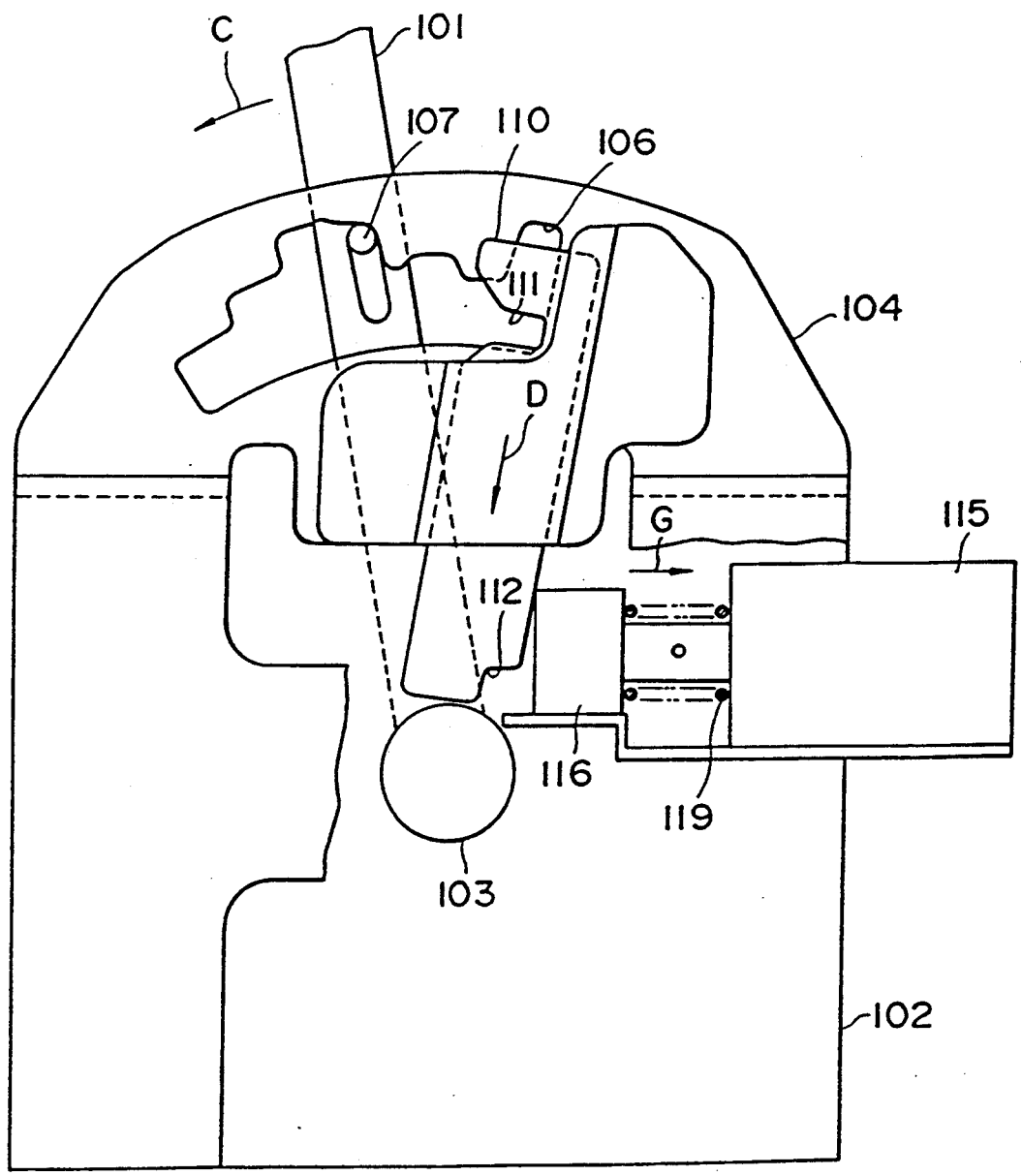
FIG. 10 is a view corresponding to FIG. 6.

FIGS. 9 and 10 show a fourth embodiment of the present invention. The fourth embodiment is discriminated from the third embodiment by the following feature. Namely, the fourth embodiment lacks the lock lever 113 which is arranged in the third embodiment so as to act between the movable member 110 and the solenoid 115. In addition, the solenoid 115 is disposed on the right side of the movable member 110. In this embodiment, therefore, the actuator rod 116 is urged in the direction counter to the arrow G by the force of the compression coiled spring 119 when the solenoid 115 is not energized while the shift lever 101 is set in the P position. In this state, the actuator rod 116 directly engages with the notch 112 in the movable member 110n so as to hold the movable member 110 in the lock position. The actuator rod 116 serves as a lock member. Then, as the solenoid 115 is turned on, the actuator rod 16 is attracted in the direction of the arrow G away from the movable member 110 thereby to free the movable member. When the shift lever 101 is in a position other than the P position, the solenoid 115 is not energized so that the actuator rod 116 is held in contact with the right side edge of the movable member 110.

Figure 11:
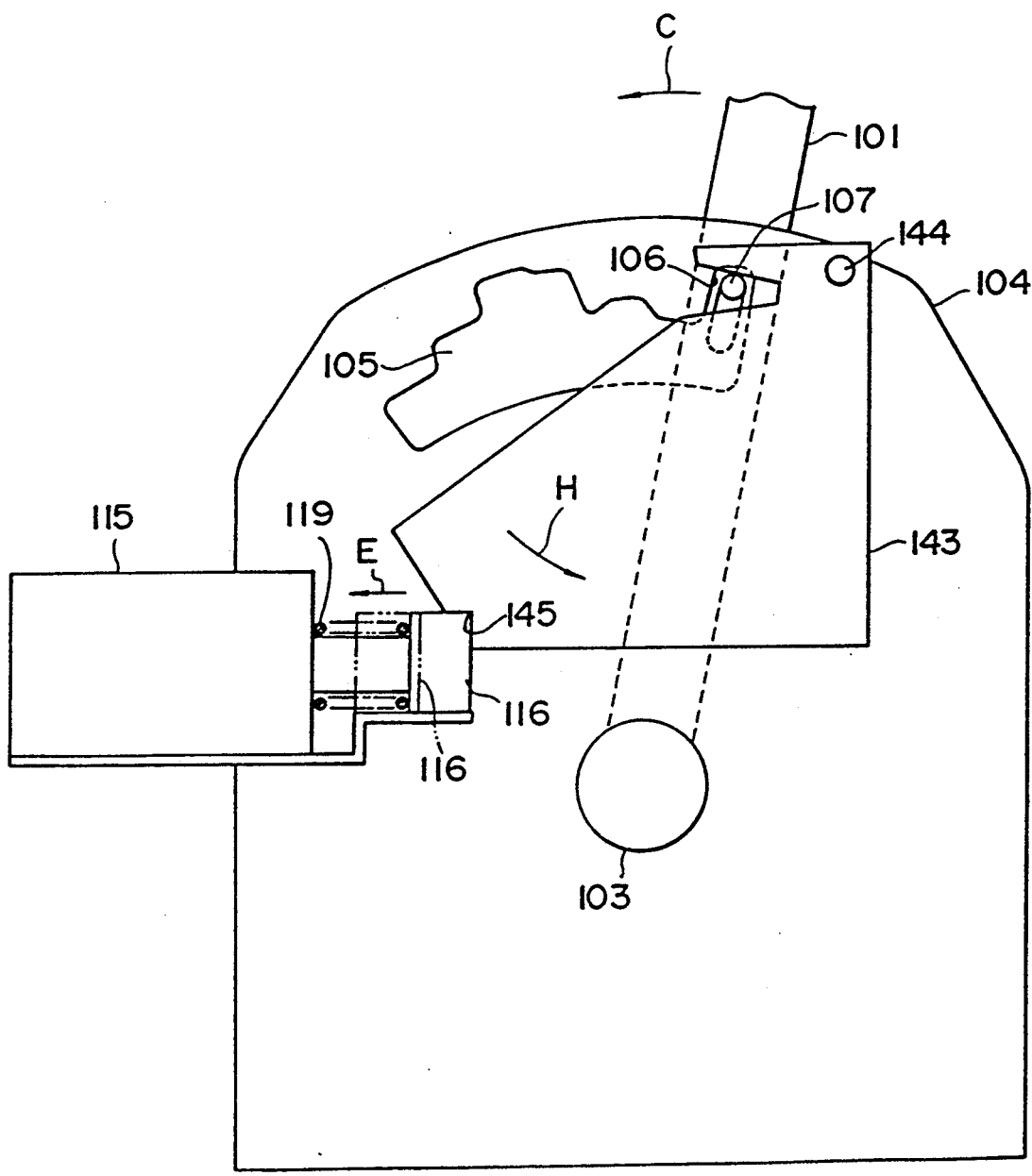
FIG. 11 is a view corresponding to that in FIG. 5 but showing a fifth embodiment of the present invention.
Figure 12:
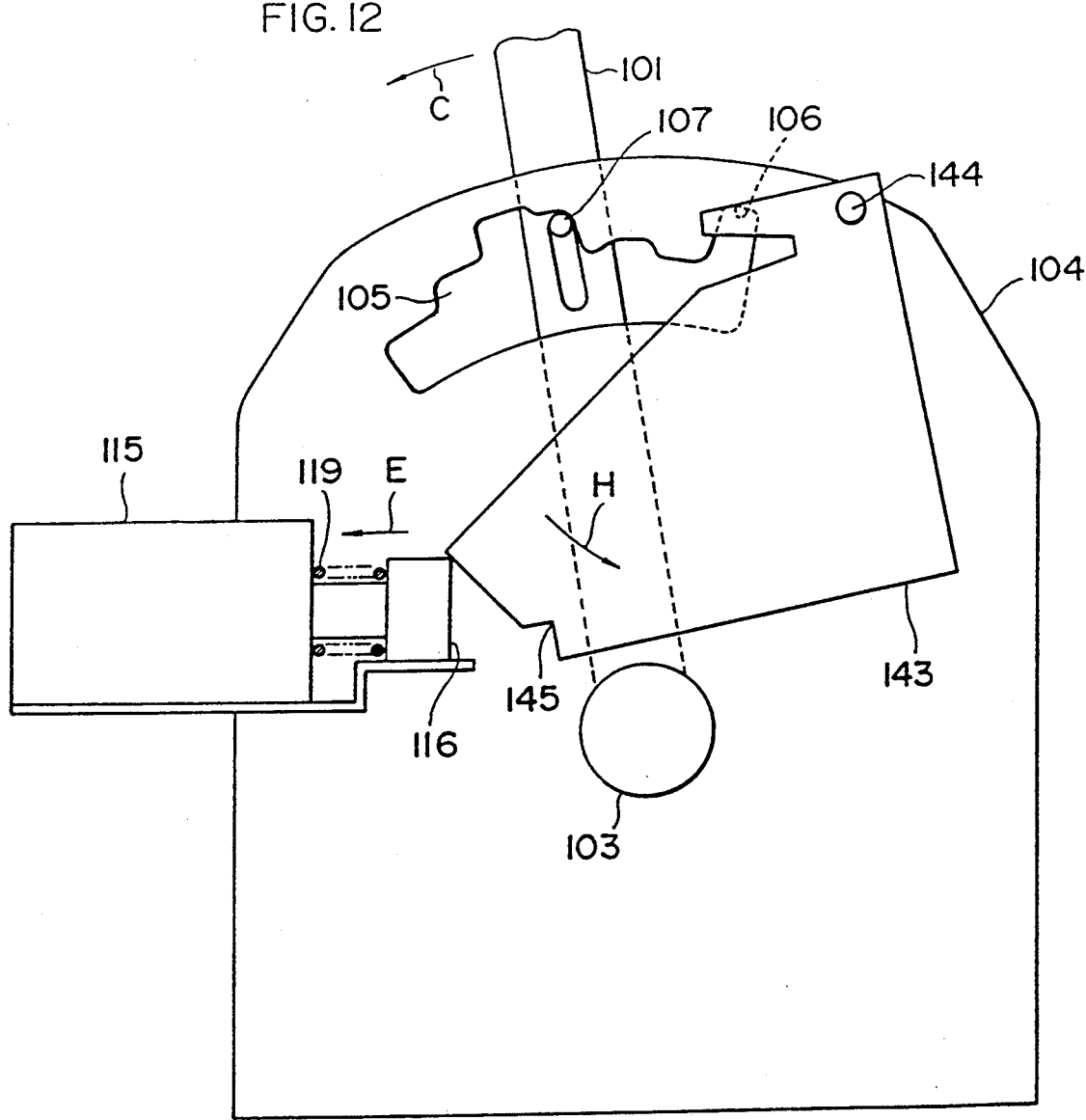
FIG. 12 is a view corresponding to FIG. 6 but showing the fifth embodiment of the present invention.

FIGS. 11 and 12 illustrate a fifth embodiment of the present invention. The fifth embodiment is different from the third and fourth embodiments in that the movable member 143 is rotatable about a fulcrum 144. Referring to FIG. 11, when the solenoid 15 is not energized while the shift lever 101 is set in the P position, the actuator rod 116 is urged in the direction counter to an arrow E by the force of the coiled compression spring 119 so as to be held in engagement with a notch 145 in the movable member 143 so as to prevent the movable member 143 from rotating in the direction of the arrow H, thus holding the movable member 143 in the lock position. Then, as the solenoid 115 is energized, the actuator rod 116 is attracted in the direction of the arrow E as sown by two-dot-and-dash line out of engagement with the notch 145 of the movable member 143. In consequence, the movable member 143 is allowed to rotate in the direction of the arrow H. When the shift lever 101 is set in a position other than the P position, the solenoid 115 is not energized so that the actuator rod 116 is held in contact with the side edge of the movable member 143 as shown in FIG. 12.

Figure 13:
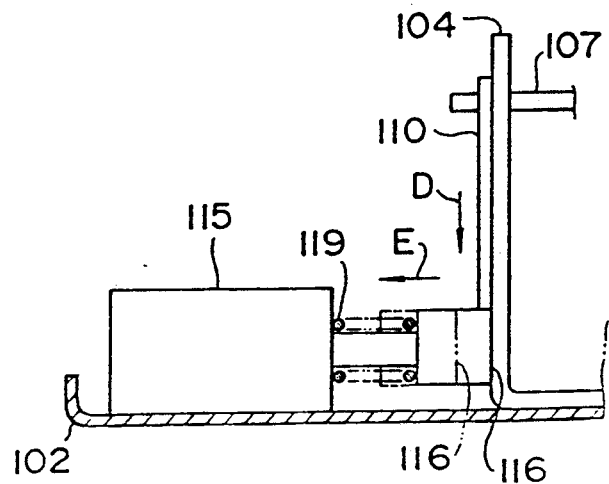
FIG. 13 is a sectional front elevational view of an essential portion of a six embodiment of the present invention.

FIG. 13 illustrates a sixth embodiment of the present invention. The six embodiment is distinguished from preceding embodiment in that the solenoid 115 is arranged such that the actuator rod 116 thereof extends orthogonally to the detent plate 104. In this embodiment, when the solenoid 15 is not energized, the actuator rod 116 is urged by the force of the coiled compression spring 119 in the direction counter to the arrow E as sown by solenoid line in FIG. 13. In this state, the actuator rod 116 is held in contact with the lower end of the movable member 110 so as to prevent the movable member from moving downward, thus holding the movable member 110 in the lock position. Then as the solenoid 115 is turned on, the actuator 116 is attracted in the direction of the arrow E away from the movable member 110 so as to free the movable member 110 as shown by two-dot-and-dash line in FIG. 13. In the third to sixth embodiments as described, the movable member is held in the lock position so as to lock the shift lever 101 when the solenoid 115 is not energized, and movable member is freed to unlock the shift lever 101 when the solenoid 115 is energized. Such an arrangement, however, is only illustrative. Namely, the third to sixth embodiments as described may be modified such that the shift lever 101 is locked when the solenoid 115 is energized and unlocked in response to de-energization of the solenoid 115.

The solenoid actuator used in these embodiments may be of the type in which the actuator rod, which has been moved to a position as a result of energization of the solenoid, is held in this position even when the solenoid is de-energized.

The solenoid 115 used as an electric actuator in the third to sixth embodiments may be substituted by a different type of electric actuator such as an electric motor.

It is also to be understood that the third to sixth embodiments may be modified such that the shift lever 101 is lockable in the N position which also is a non-driving position of the shift lever 101, although locking in the P position has been described.

Figure 14:
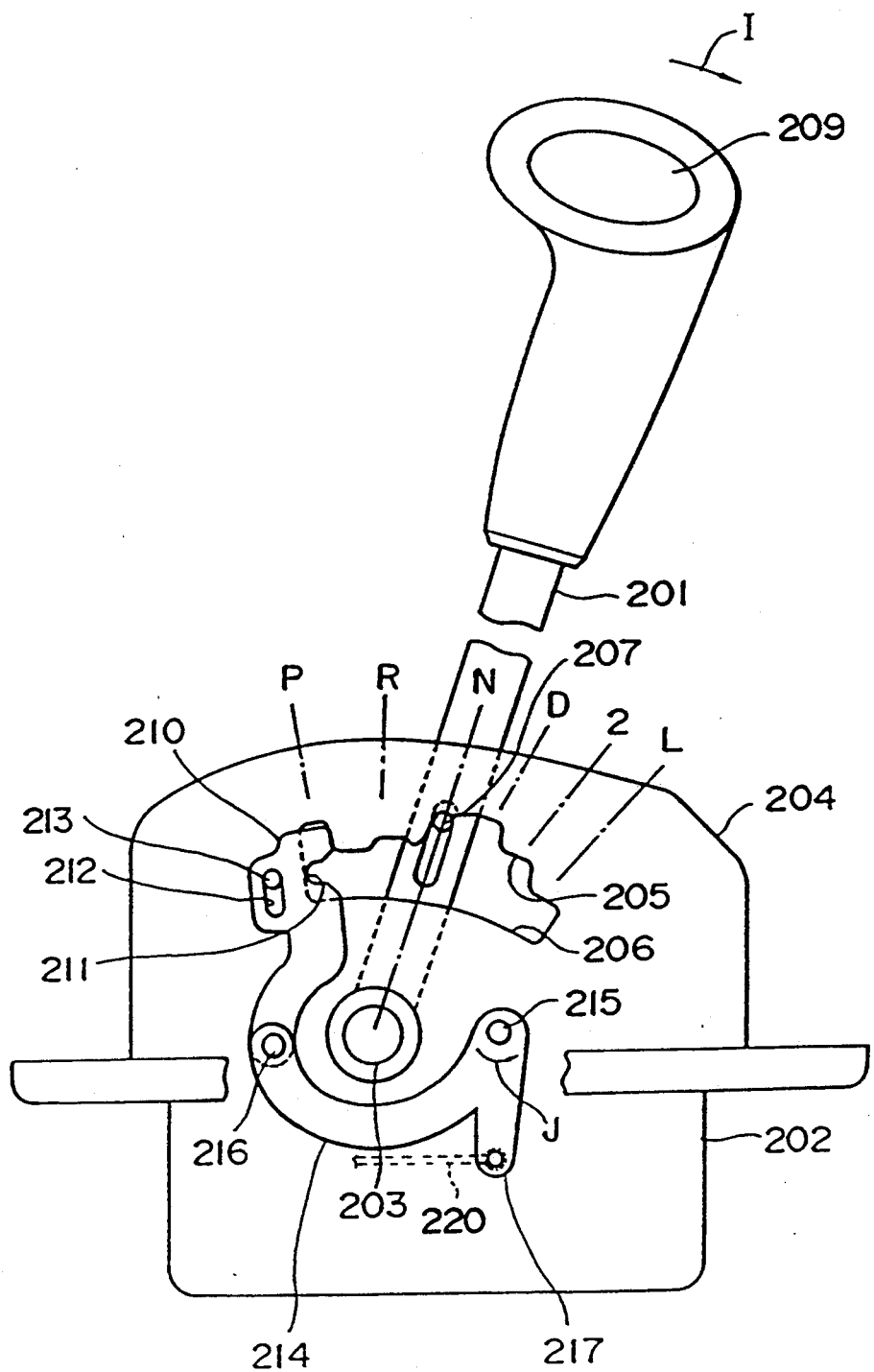
FIG. 14 is a partly-sectioned side elevational view of a seventh embodiment of the present invention.

A description will be made hereafter with regard to a seventh embodiment of the present invention in accordance with FIGS. 14 and 15. A shift lever 201 is swingable or rotating about a fulcrum constituted by as shaft 203 which is secured to a machine frame 202, in the direction of an arrow I and in the direction counter to the arrow I. A detent plate 204 fixed to one side of the frame 202 has an engaging aperture 206 the upper edge of which is configured so as to provide latching step 205 which are arranged in the direction of movement of the shift lever 201 as will be clearly seen in FIG. 14. These latching steps 205 are adapted to cooperate with a later-mentioned detent pin 207 in latching the shift lever 201 selectively in one of a plurality of lever position which are the P position, R position, N position, D position, 2nd position and the L position as shown in FIG. 14. A locking recess 208 is provided in the portion of the upper edge of the engaging aperture corresponding to the P position of shift lever 201. The detent pin 207 is movable on the shift lever 201 in the axial direction of this lever 201. The arrangement is such that, when the push button 209 provided on the upper end of the shift lever 201 is manually pressed by the driver, the detent pin 207 is moved in one direction which is in this case downward direction out of engagement with the latching step provided by the upper edge of the engaging aperture 206. When the push button is released, the detent pin 207 is moved upward into engagement with one of the latching steps 205 provided by the upper edge of the engaging aperture 206, thus latching the shift lever selectively in one of the plurality of the above-mentioned position in cooperation with the detent plate 204.

Figure 15:
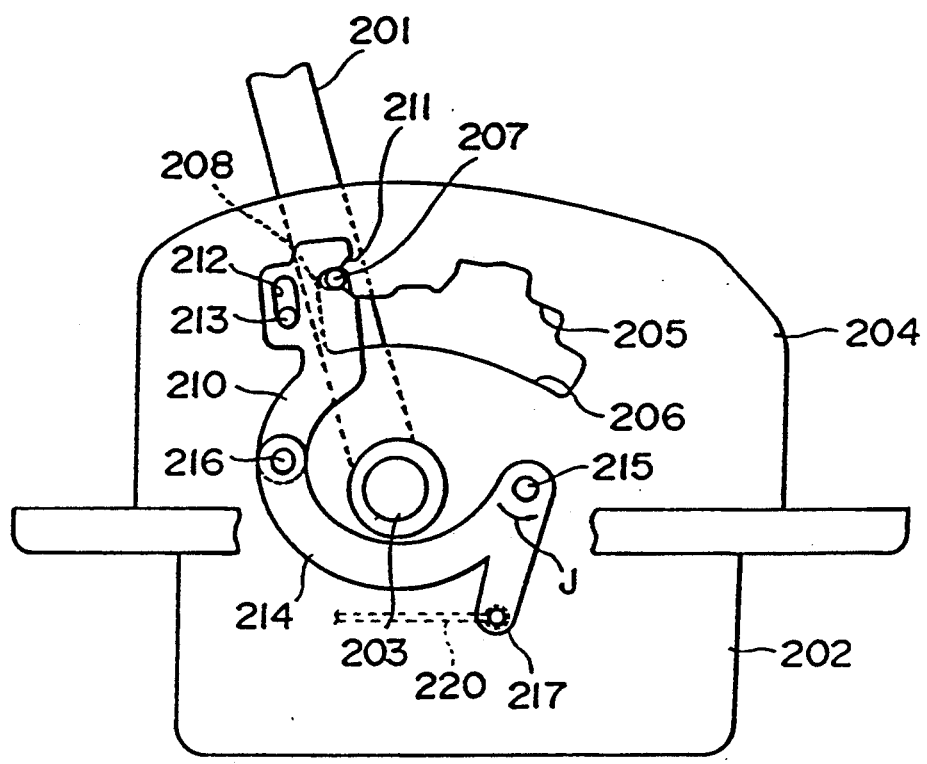
FIG. 15 is a partly-sectioned side elevational view of the seventh embodiment in a state different from that shown in FIG. 14.

A reference numeral 210 designates a movable member which is provided at its upper portion with an engaging recess 211 which opens to the right as shown in FIGS. 14 and 15. The movable member 210 also is provided at its left upper portion with an elongated hole 212 which serves as a guide hole and receives a pin 213 provided on a portion of the detent plate 204 near the locking recess 208. The engaging recess 211 is movable along a line which interconnects the shaft 203 and the locking recess 208. A lever member 214 is rotatably supported at its one end, e.g., at the right end as illustrated, by the detent plate 204 through a shaft 215, while the other end, e.g., the left end as illustrated, is swingably or rotating connected to the lower end of the movable member 210 through the shaft 216. An arm 217 which is integral with the lever member 214 extends downward from the right end of the lever member 214 as shown in FIG. 14. A steering lock device is connected to the end of the arm 217 through a control wire 220 which is connected at its one end to the lower end of the arm 217 while the other end of the control wire 220 is connected to the steering lock device. The control wire 220 serves as a lock member. The steering lock device can be set in locking condition when the lever member 214 is set in the state shown in FIG. 15. When the steering lock device is set in the locking condition, the lever member 214 is prevented from rotating in the direction of an arrow J. the arm 217 and, hence, the lever member 214 become swingable or rotatable as the steering lock device is set in the unlocking condition.

Once the arm 217 is swung in the direction of the arrow J to the position shown in FIG. 14, the steering lock device is disabled from locking the steering system.

The operation of this embodiment is as follows. It is assumed here that the steering lock device has been set in an inoperative state and the arm 217 has been swung in the direction of the arrow J as shown in FIG. 14. In this state, the driver can move the shift lever 210 from the N position to the D position but further movement of the shift lever to the 2nd or L position is prevented because the detent pin 207 abuts the wall of the recess which defined the latching step 205 for the D position. The driver, if he or she wishes to select the 2nd or L range of automatic transmission, has to press the push button 209 on the knob of the shift lever 210. As explained before, pressing of the push button 209 causes the detent pin 207 to be moved in one direction, e.g., downward as illustrated, so that the detent pin 207 can clear the above-mentioned wall of the recess defining the latching step for the D position, thus allowing the shift lever 201 to be moved to the 2nd position and further to the L position if necessary. Returning of the shift lever from L position back to the position past the 2nd and D positions can be effected without requiring pressing of the push button 209, simply by swinging or rotating the shift lever 201 in the direction counter to the arrow I, because in such a case the detent pin 207 can slide along the successive latching step 205 without being stopped.

The shift lever 201 is movable from the N position to the R and P positions by swinging the same in the direction counter to the arrow I. The shifting of the shift lever 201 from the R position to the N position can be conducted without requiring pressing of the push button 209.

When the shift lever 201 is in a position other than the P position, the movable member 210 has been lowered along the pin 213 received in the guide hole 212 due to the force of gravity so that the arm 217 has been rotated in the direction of the arrow J to the position shown in FIG. 14. In this state, the steering lock device cannot be set to the locking condition as explained before. In this state, the engine key, which has been rotated to the engine-off position, cannot be turned to the steering lock position so that the engine key cannot be extracted from the steering lock device. However, as the driver moves the shift lever 210 in the direction counter to the arrow I while pressing the push button 209, the detent pin 207 is brought into engagement with the engaging recess 211 in the movable member 210 which is now in the lowered position and, as the push button 209 is released after the shift lever 201 has been brought to the P position, the detent pin 207 is moved in the other direction, i.e., upward, into engagement with the locking recess 208 while lifting the movable member 210 to the raised position as shown in FIG. 15. The lever member 214 is rotated in the direction counter to the arrow J to the position shown in FIG. 15 as a result of the movement of the movable member 210, whereby the steering lock device becomes lockable. Thus, the engine key can be turned to the steering lock position so that it can be extracted from the steering lock device. In response to this operation, the lever member 214 becomes unable to rotate in the direction of the arrow J. In this state, therefore, the movement of the detent pin in one direction, i.e., downward direction, is inhibited so that the detent pin 207 cannot be disengaged from the locking recess 208, whereby undesirable shift of the shift lever 201 from the P position is avoided.

In the seventh embodiment as described, the steering lock device cannot be put into effect and, therefore, the engine key cannot be extracted from the steering lock device unless the shift lever of the automatic transmission is set in the P position. Thus, the seventh embodiment also prevents the engine key from being extracted during running of the automobile.

When the automobile is to be parked, the engine key can be extracted only after the steering lock device is put into effect which in turn essentially requires that the shift lever 201 is set in the P position. Thus, the driver can lock the automobile in an immobile state without fail whenever the driver extracts the engine key from the steering lock device.

Once the steering lock device is put into effect by the turning of the engine key, the shift lever 201 set in the P position also is locked in this position so that the shift lever 201 can no more be operated by any person other than the driver who carries the engine key with him.

The seventh embodiment as described offers an additional advantage in that the stress can conveniently be distributed by virtue of the articulated construction employing the shaft or pin 216 through which the movable member 210 and the lever member 214 are connected to each other. This in turn allows these parts to be manufactured from less-expensive materials.

Figure 16:
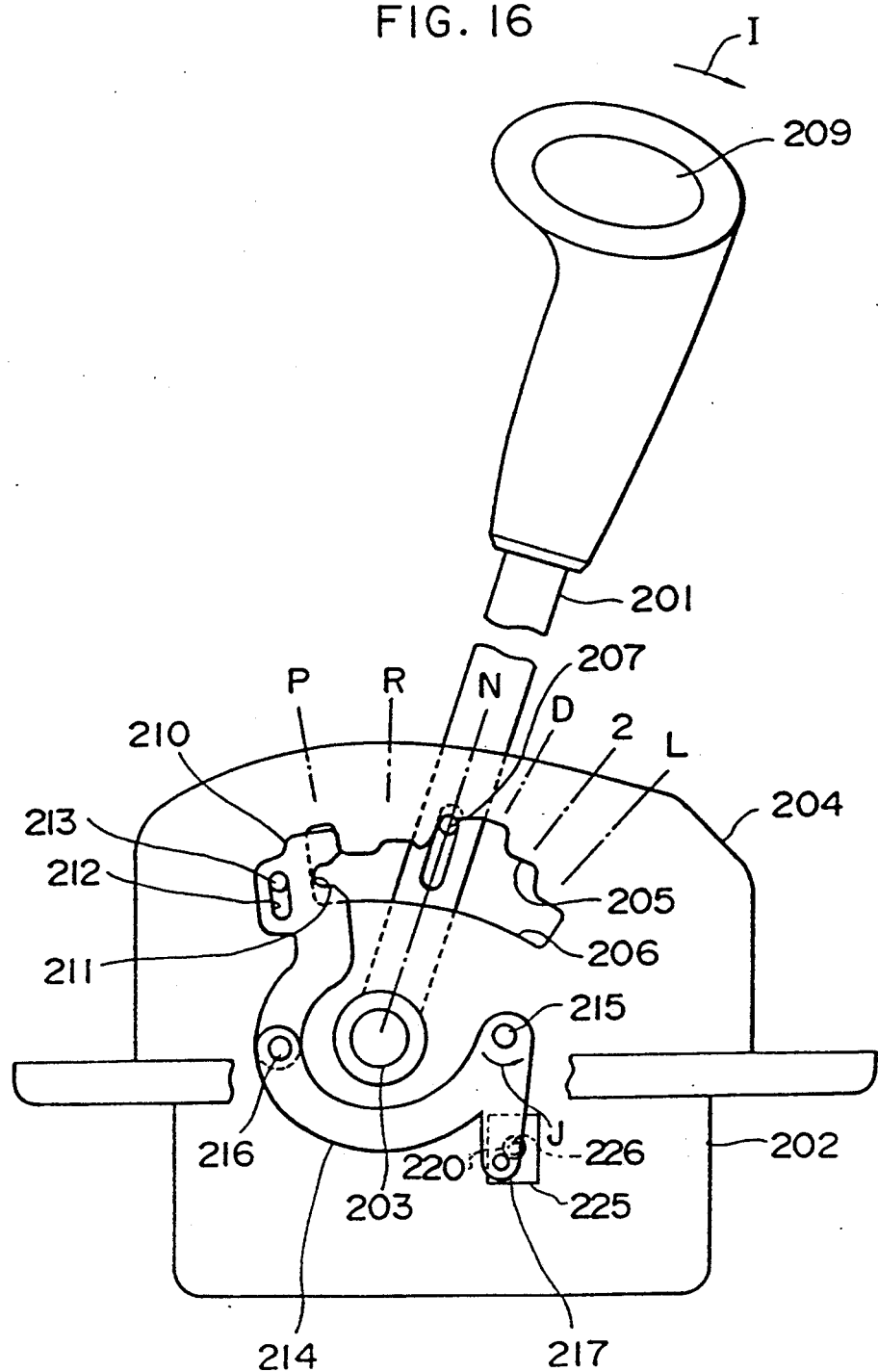
FIG. 16 is a partly-sectioned side elevational view of an eighth embodiment of the present invention.
Figure 17:
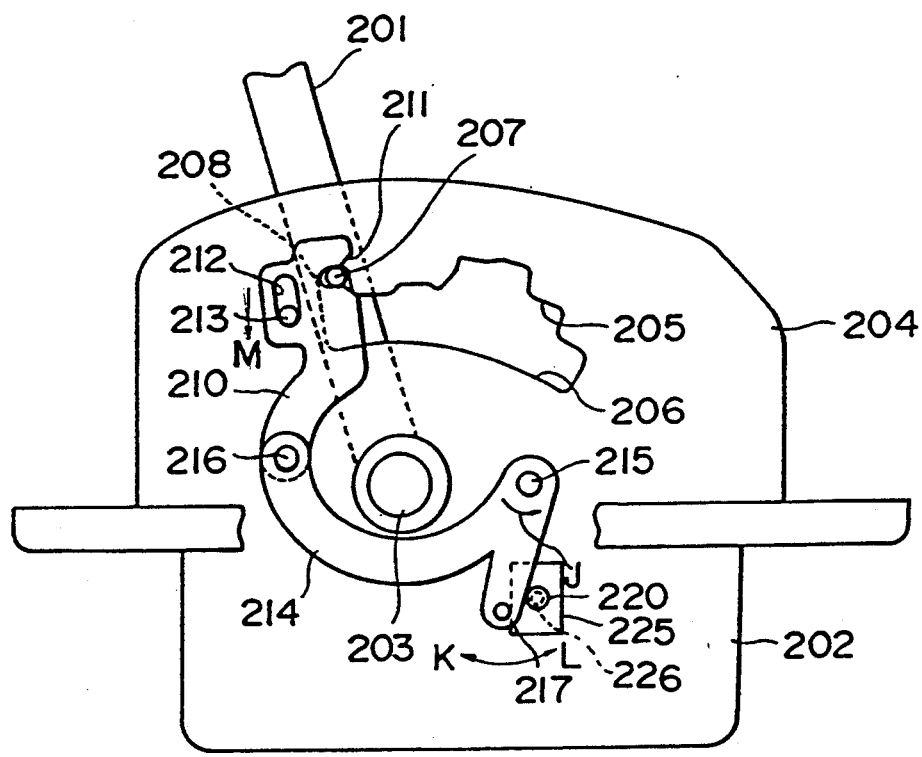
FIG. 17 is a partly-sectioned side elevational view of the eighth embodiment in a state different from that shown in FIG. 16.

Referring to FIGS. 16 and 17, an eighth embodiment is shown. A solenoid 225 is provided in vicinity of the arm 217, and serves as an electric actuating device. The solenoid 225 has an actuator rod 226 which projects transversely against the arm 217 to cross the arm and serves as the lock member.

With regard to the eighth embodiment, the mechanical operating system of the movable member 210 through the arm 217 in the seventh embodiment is replaced by the electrically operating system of the solenoid in the eighth embodiment. Other portion of the eighth embodiment, as well as the operation, are materially the same as those of the seventh embodiment.

In the eighth embodiment, actuator rod 226 contacts at its end with the arm 217. A coiled compression spring 229 is disposed between the solenoid 225 and an end portion of the actuator rod 226. The solenoid 225 is adapted to be electrically energized only when all the three conditions are simultaneously satisfied: namely, setting the shift lever 201 in the P position, switching on the ignition switch and putting on the foot brake pedal. As the solenoid 225 is energized, the actuator rod 226 is electromagnetically attracted to the solenoid 225 against the force of the coiled compression spring 229 so as to swing or rotate the arm 217 in the direction of an arrow L. When at least of these three condition fails to be met, the solenoid 225 is not energized so that the actuator rod 226 is pushed by the force of the compression coiled spring 229 in the direction of the arm 217 to prevent the arm 217 from moving by contacting with the arm 217.

The description of the electric circuit for controlling the solenoid 225 is referred in accordance with FIG. 7, in the eighth embodiment. The solenoid 225 is not energized whenever at least one of the ignition switch 120, P position detection switch 121 and the foot brake switch 122 is off. In such a state, the actuator rod 226 is urged in the direction of the arm 217 by force of the compression spring 229. The ignition switch 120 is turned on as the driver turns the ignition key. The P position detecting switch 121 is turned on if the shift lever 201 has been set in the P position. The foot brake switch 122 is turned on as the driver pits on the foot brake. When all these three switches are on, i.e., when all the three conditions mentioned above are satisfied, the transistor 123 is turned on so as to turn on also the transistor 124 and further the transistors 125 and 126. In consequence, the solenoid 225 is supplied with electric power so that the actuator rod 226 is attracted to move in the direction of the solenoid 225 against the force of the compression coiled spring 119. The voltage of the electric power supplied to the solenoid 226 at the time of start-up is 12 V. The transistor 125 is turned off as the capacitor 127 connected to the base of the transistor 125 is charged up. Thereafter, the solenoid 225 is energized only through the transistor 126 and the resistor 132, so that the voltage applied to the solenoid 225 is lowered to about 8 V. When at least one of the ignition switch 120, P position detection switch 121 and the foot brake switch 122 is turned off, i.e., when at least one of the above-mentioned three condition is no longer maintained, a potential difference is developed across the resistor 136 during discharging of the capacitor 127, so that a base current flows through the base of the transistor 126 so as to gently turn off the transistor 126.

It is assumed here that the foot brake pedal is not being put on while the ignition switch 120 is in the on state and the shift lever 201 is in the P position. In this state, the detent pin 207 is received by the locking recess 208 in the detent plate 204 and is kept in engagement with the engaging recess of the movable member 210 whereby the movable member 210 is held in the lock position. Meanwhile, the solenoid 225 is kept in off state so that the actuator rod 226 of the solenoid 225 is urged in the direction to the arm 217 by the force of the coiled spring 229. Therefore, the arm 217 is prevented from swinging or rotating by the actuator rod 226. In this state, the movable member 210, which is held in engagement with the detent pin 207, is prevented from moving because it is stopped by the arm 217. In this state, the detent pin 207 cannot move downward even if the push button 209 on the shift lever 201 is pressed, so that the shift lever 201 cannot move from P position to another shift position. Thus, the shift lever 201 is immovably locked in the P position when the foot brake pedal is not put on by the driver. As the driver applied the foot brake, the solenoid 225 is turned on so that the actuator 226 is attracted in the direction of the solenoid 225, with the result that the arm is released to swing or rotate in the direction of the arrow L, whereby the movable member is released to move downward by the force of the gravity. As the push button 209 is pressed in this state, the detent pin 207 is moved downward as indicated together with the movable member 210, so that the movable member 210 is set in an unlocking position as shown in FIG. 16. In this state, the detent pin 207 has been disengaged from the locking recess 208, so that the shift lever 201 can be moved from the P position to another position.

When the driver has moved the shift lever 201 to the P position while pressing the push button 209, the detent pin 207 is brought into engagement with the engaging recess 211 in the movable member 210. Then, as the push button is released, the detent pin 207 together with the movable member 210 is moved upward counter to the arrow D so that the detent pin 207 is brought into engagement with the locking recess 208 while the movable member 210 is set in the lock position, whereby the shift lever 201 is immovably locked in the P position as shown in FIG. 5.

As will be understood from the foregoing description, in the eighth embodiment of the present invention, the solenoid 225 is never energized even if the ignition key is turned on while the shift lever 201 is set in the P position, unless the foot brake pedal is put on. In other word, the driver is obliged to apply the foot brake pedal in order to move the shift lever from the P position to another position. This arrangement therefore serves as a safety arrangement which eliminates the shift lever to be set in a driving position such as D, 2nd or L position from P position while the foot brake pedal is not put on by the driver.

Another advantage offered by these embodiments is that the solenoid 225 is energized only when all the three conditions, i.e., setting the shift lever 201 in the P position, switching on the ignition switch 120 and applying the foot brake, are simultaneously satisfied.

Although in the seventh, eighth and ninth embodiments the shift lever 201 is locked in the P position as a non-driving position on condition that the steering system is locked by means of the engine key, this is only illustrative and the arrangement may be such that the shift lever 201 is locked in the P position on condition that the foot brake pedal has not been pushed and unlocked on condition that the same pedal has been pushed.

It is also possible to arrange such that the shift lever 201 is locked in the N position which also is a non-driving shift position of the automatic transmission, although locking in the P position has been specifically described.

What is claimed is:

1. A shift lever locking device for locking an automatic transmission lever which is capable of being selectively moved to and set in one of a plurality of shift position including at least one non-driving position, said device comprising:

a detent pin provided on said shift lever and designed to be moved in one direction in response to pressing of a button provided on said lever;

a detent plate capable of selectively latching said shift lever in cooperation with said detent pin and having a locking recess capable of receiving said detent pin when said detent pin is moved in the other direction after said shift lever is set in said non-driving position;

a movable member independent of said shift lever and said detent pin and capable of engagement with said detent pin at least when said detent pin is being brought into engagement with said locking recess and movable between a lock position where it engages with said detent pin so as to prevent said detent pin from moving and an unlock position where it is disengageable from said detent pin to allow said detent pin to move, said movable member including a first lever engageable at one end with said detent pin and a second lever pivotably connected at one end with the other end of said first lever, the other end of said second lever being pivoted on said detent plate; and a lock member independent of said shift lever and said detent pin and movable between a first position where it retains said movable member against movement from said lock position and a second position for movement of said movable member to said unlock position and capable of being moved from said first position to said second position when a predetermined condition is met while said shift lever has been set in said non-driving position.

2. A device according to claim 1, wherein said lock member, in said first position, is held in engagement with said movable member to prevent said movable member from moving to said unlock position and, in said second position, releases said movable member to allow movement of said movable member to said unlock position.

3. A device according to claim 1, further comprising an actuating means for causing said lock member to move.

4. A device according to claim 3, wherein said lock member includes a control wire mechanically connected to said movable member and said actuator means.

5. A device according to claim 2, wherein said lock member is linearly movable between said first and second positions.

6. A device according to claim 3, wherein said actuating means includes a solenoid device operative in response to an electrical signal produced when said predetermined condition is met, said lock member being operably connected to said solenoid device to engage and disengage with said movable member.

7. A device according to claim 1, wherein said movable member includes an arm member and guide means on said first lever member, the other end of said second lever member being integrally connected to said arm member.

8. A device according to claim 6, wherein said movable member is adapted to be engaged by said detent pin when said shift lever is moved to said non-driving position, so as to move from said unlock position to said lock position following the movement of said detent pin in the other direction.

9. A device according to claim 7, wherein said first lever member is linearly movable between said lock position and said unlock position along said guide means.

10. A device according to claim 7, wherein said second lever member and said arm member are swingable between said lock position and said unlock position.

11. A device according to claim 1, wherein said movable member has an engaging recess for receiving said detent pin.

12. The device according to claim 1 wherein the shift lever is movable about a fixed pivot axis and wherein said first and second levers are at least partially arcuate in configuration to extend about said fixed pivot axis.

13. The device according to claim 1 wherein said second lever includes an arm projecting from said other end thereof, said lock member being engageable with said arm.

14. The device according to claim 1 wherein first lever includes guide means for controlling movement of at least said one end thereof.

15. A shift lever locking device for locking an automatic transmission shift lever which has a lever portion and a knob on one end of said lever portion and which is capable of being selectively moved to and set in one of a plurality of shift positions including at least one non-driving position, said device comprising:

a detent pin provided on said lever portion of said shift lever and designed to be moved in one direction in response to pressing of a button provided on said knob of said shift lever;

a detent plate capable of cooperating with said detent pin when said detent pin has been moved in the other direction by imparting to the operator a manual sensation in response to the movement of said shift lever that indicates said shift lever has become latched in one of said shift positions, said detent plate having a locking recess capable of receiving said detent pin when said detent pin is moved in the other direction after said shift lever is set in said non-driving position;

a movable member independent of said shift lever and said detent pin, and capable of engagement with said detent pin at least when said detent pin is being brought into engagement with said locking recess and movable between a lock position where it engages with said detent pin so as to prevent said detent pin from moving and an unlock position where it is disengageable from said detent pin to allow said detent pin to move, said movable member including a first lever engageable at one end with said detent pin and a second lever pivotably connected at one end with the other end of said first lever, the other end of said second lever being pivoted on said detent plate; and a lock member independent of said shift lever and said detent pin and movable between a first position where it retains said movable member against movement from said lock position and a second position for movement of said movable member to said unlock position and capable of being moved from said first position to said second position when a predetermined condition is met while said shift lever has been set in said non-driving position.

16. A device according to claim 15, wherein said lock member, when in said first position, is held in engagement with said movable member to prevent said movable member from moving to said unlock position and, when in said second position, releases said movable member to allow movement of said movable member to said unlock position.

17. A device according to claim 16, wherein said lock member is movable to operate said movable member between said first and second position.

18. A device according to claim 16, wherein said lock member is linearly movable to lock and release said movable member between said first and second positions.

19. A device according to claim 15, further comprising actuating means for causing said lock member to move.

20. A device according to claim 19, wherein said lock member includes a control wire mechanically connected to said movable member and said actuator means.

21. A device according to claim 19, wherein said actuating means includes a solenoid device operative in response to an electrical signal produced when said predetermined condition is met, said lock member being operably connected to said solenoid device to engage and disengage with said movable member.

22. A device according to claim 15, wherein said movable member includes an arm member and guide means on said first lever member, the other end of said second lever member being integrally connected to said arm member.

23. A device according to claim 15, wherein said movable member is adapted to be engaged by said detent pin when said shift lever is moved to said non-driving position, so as to move from said unlock position to said lock position following the movement of said detent pin in the other direction.

* * * * *

UNITED STATES PATENT AND TRADEMARK OFFICE
CERTIFICATE OF CORRECTION

PATENT NO. : 5,127,245

DATED : July 7, 1992

INVENTOR(S) : Hajime IMAI et al.

It is certified that error appears in the above-identified patent and that said Letters Patent is hereby corrected as shown below:

On the title page:

Item [75]   Inventors, change "Shingetoshi Miyoshi" to --Shigetoshi Miyoshi--.

Claim 1, column 14, line 38, change "position" (first occurrence) to --positions--.

Signed and Sealed this

Fifth Day of October, 1993

BRUCE LEHMAN

*Attest:*

*Attesting Officer*     *Commissioner of Patents and Trademarks*